United States Patent [19]

Hardigg

[11] Patent Number: 4,741,972
[45] Date of Patent: May 3, 1988

[54] ROTOMOLD INSERT

[75] Inventor: James S. Hardigg, Conway, Mass.

[73] Assignee: Hardigg Industries, South Deerfield, Mass.

[21] Appl. No.: 941,337

[22] Filed: Dec. 15, 1986

[51] Int. Cl.$^4$ .............................................. B32B 3/26
[52] U.S. Cl. .............................. 428/542.8; 156/303.1; 428/67
[58] Field of Search ............ 428/13, 67, 542.8; 156/298, 303.1; 24/169, 198, 200; D11/213, 218

[56] References Cited

U.S. PATENT DOCUMENTS

| D. 40,432 | 1/1910 | Kemp | D11/218 |
|---|---|---|---|
| D. 97,048 | 10/1935 | Freysinger | D11/218 |
| 2,731,672 | 1/1956 | Davis et al. | 428/13 X |
| 2,867,053 | 1/1959 | Boor | 428/13 X |
| 3,875,275 | 4/1975 | Lemelson | 428/319.7 X |
| 3,886,248 | 5/1975 | Nicholson | 428/13 X |
| 4,043,721 | 8/1977 | Lemelson | 425/577 X |
| 4,142,757 | 3/1979 | Fogle, Jr. | 297/DIG. 2 |
| 4,284,202 | 8/1981 | Barstow, Jr. | 220/4 B |
| 4,399,568 | 8/1983 | Pfleger | 24/169 X |
| 4,571,319 | 2/1986 | Baluch et al. | 264/53 X |
| 4,652,415 | 3/1987 | Nguyen et al. | 264/275 X |

*Primary Examiner*—Henry F. Epstein
*Attorney, Agent, or Firm*—Cushman, Darby & Cushman

[57] ABSTRACT

A molded container insert for providing a secure attaching point for hardware such as latches, hinges and handles. The insert includes a central portion having a rounded streamlined rear surface, a relatively large flat face and a pair of side wings spaced laterally from the central portion of the insert and which extend above the below the horizontal plane respectively defined by the top and bottom edges of the central portion.

11 Claims, 2 Drawing Sheets

ROTOMOLD INSERT

FIELD OF THE PRESENT INVENTION

The present invention relates to an insert member for use in forming rotationally molded plastic products, such as hollow cases, the insert providing an embedded securing device which can be used to attach items such as hinges, handles and latches to the molded product.

BACKGROUND OF THE PRESENT INVENTION

Many rotationally-molded plastic products, such as suitcase halves or two piece, hollow shipping containers, require use of latches, hinges and occasionally handles. These items must necessarily be attached to portions of the container adjacent the parting line of each half of the container and preferably within grooves or indented portions of the container side wall. If the container is to be water-tight and/or air-tight, not only initially but over a period of years, the latches and hinges must be attached in a way that will be strong enough to withstand shock forces up to the strength of the attached items and so that they resist a steady force equal to that portion of the compressive force on the container's gasket that each item bears, as well as repetitive intermediate forces due to vibration.

Since attached items are subject to damage in service, it is also necessary to be able to replace them in the field with relatively simple equipment and without causing damage to the container. Fasteners can include such items as rivets, especially "blind" rivets, and screws with rivets being preferred as they are less likely to be removed by unauthorized persons trying to open the container during transportation and handling.

In known arrangements where hardware is directly attached by rivets to the plastic wall of the container, the plastic, such as polyethylene, may not be hard or strong enough to hold the rivet and resist forces that may be applied. Consequently, various strengthening approaches have been tried, such as using a metal washer, in an effort to strengthen the inner joint between the rivet and the inner surface of the container so the rivet will not pull out. These approaches have not proved to be entirely successful.

While rivets will normally be set tightly initially and will exhibit sufficient strength to hold a latch, for example, tightly against the container wall, and while there may be sufficient frictional force to help resist latch pull, such a connection will weaken in time due to rough handling during service in transportation where impact loads may have been applied to the latches and where there may have been alternate exposure to high and low temperatures. The impact loads will cause the rivets to loosen which, in turn, will change the latch connection. Also, it has been found that at somewhat elevated temperatures, the thermal expansion of the riveted plastic material immediately around the rivet and between the latch and the washer causes a thermal stress far beyond the compressive yield stress of polyethylene at the elevated temperature. Consequently, elevated temperatures cause permanent loosening of the rivets once the plastic returns to room temperature.

A widely used commercially available, latch, is the Simmons Link-Lock No. 2. When made of low carbon steel, this latch is rated at 350 lbs pull. It is capable of producing about 90 lbs. of gasket compressing force without undue pressure on the operator's fingers. This latch is normally attached with two $\frac{1}{8}$ in. diameter rivets. If the plastic wall of the container is 0.20 in. thick, the average compressive stress in the plastic due to a 90 lb. steady load after the rivets are slightly loosened, is $$\frac{90}{1 \times 0.125 \times 0.20} = 1800 \text{ lb/in}^2$$

The actual peak stress in the plastic material is substantially higher because the rivet, once it is not axially tight, bears more heavily on the inner and outer surfaces of the container. A steady compressive stress of over 300 lb/in$^2$ causes creep in polyethylene even at room temperature. At higher temperatures, the polyethylene is even less able to support the stress. Also, at higher temperatures, expansion of the polyethylene in the pull direction of the latch, causes a greater steady force to be exerted on the latch which in turn increases the stress in the material around the rivets.

During container impacts, a latch rated at 350 lb. pull may exert forces up to this amount on the pair of $\frac{1}{8}$ in. rivets. For a 300 lb. latch force, the average compressive stress around the rivet for 0.20 in. thick material would be:

$$\frac{300}{2 \times 0.125 \times 0.20} = 6{,}000 \text{ lb/in}^2$$

This value is far beyond the yield stress of polyethylene.

During vibration in transportation, the container latches may be subjected to forces greater than the gasket force and less than impact forces. These intermediate forces may well be exerted thousands of times, and will gradually cause the rivets to become loose.

When a rivet becomes loose, the likelihood of air and moisture leaking in is greatly increased. Some container manufacturers daub sealant over the inner ends of the rivets in an effort to prevent such leakage.

If the rivets become sufficiently loose, the compression of the gasket material can be reduced and, thereby, permit leakage at the container parting line.

In an effort to reduce the deficiencies of direct-riveting latches and hinges to polyethylene containers a rotomolded container using embedded rivet inserts or receptors was developed and is described in Barstow, Jr. U.S. Pat. No. 4,284,202. Here the embedded rivet insert receptors are one piece, elongated oval structures substantially like the one shown in FIGS. 1-4. The substance of Barstow, Jr. is hereby incorporated by reference.

The insert 10, is comprised of a body portion 12 formed with front and rear sections, 14 and 16, respectively, integrally connected together by a hinge 18. A pair of relatively long out-board wings 20 and 22 were used with each insert and extended from opposite sides of the front section 14. Each wing included spaced apart upper and lower horizontal arms, 24 and 26 and an outer vertical arm 28 connecting the upper and lower arms together. As shown in FIGS. 1 and 4, just prior to use wings 20 and 22 would have to be bent at an angle from about 30 degrees to about 60 degrees toward the front section so as to conform to and generally follow the desired container shape where the insert was to be placed. Each insert was usually positioned in a well or recessed area, often called a groove, molded within the side wall of the container. Further, the insert was most desirably positioned adjacent or close to the parting line of each of the top and bottom sections of the container.

The front wall of section 14 of the insert was also provided with apertures 30, 32 through which blind rivets 34 could be inserted to fasten a latch or other item as indicated at 36.

During molding the insert shown in FIGS. 1–4 was temporarily fastened to the interior surface of the mold by a magnet. The front wall, however, extended only slightly ahead of the wings, in an attempt to space the wings outwardly away from the interior of the mold in order to allow plastic to be formed there about and the front face was generally rounded except for a flattened area between apertures 30 and 32. It was also hoped that the insert would provide a greatly increased bearing area within the molded container material as compared with only using two ⅛ in. rivets directly in the plastic. When the rear section 16 was folded into place via hinge 18 it provided a hollow space 38, behind the front section, for the expansion of blind rivets. This space was made deep enough, front-to-back, to permit insertion of unpulled blind rivets, and with a volume sufficient to accommodate several drilled-off rivet ends to provide for re-riveting should that have to be done.

The side wings or loops of the insert were designed to provide part of the bearing area and to resist the rotational forces exerted by the latches and hinges when closed. The wings were also designed to provide resistance to side-wise loads exerted by latches which might occur when the latch was open and hanging out from the container and struck from the side.

It was found that the dimensions of the molds themselves varied from one mold to another so that in order to accommodate the shape of the indent or groove portion where this insert was to be placed, wings 20 and 22 had to be bent manually and in different amounts in order to accommodate the particular mold in which an insert was to be used. In many instances, wings 20 and 22, which were substantially long and about equal to the length of the main body portion, would be bent incorrectly either too far forward toward the mold or not bent far enough so that they would project too far toward the rea surface what would become the inside of the finished container. If the former occurred, the wings themselves would protrude through or be visible at the front surface of the container and by reducing the distance between the mold and the wings flow of the powdered plastic resin about the wings as well as the front of the insert was impaired. This caused the creation of voids at various places about the wings and about the main body portion, relative to the front face of the insert, which were objectionable. If the latter occurred, the wings could protrude through to the interior of the container and not be fully embedded.

It was also found that in practice the wall thickness of the containers had to be 0.2 inches or greater to avoid having leaks due to molding voids about the inserts which communicated through the container wall. In many cases, the wall thickness of the container was greater than otherwise necessary due to the inserts.

In order to minimize container weight and cost, it is desirable to have an improved insert which can be molded in a leak-proof manner in thinner container walls while retaining satisfactory attachment strength.

SUMMARY OF THE PRESENT INVENTION

The present invention relates to a modified insert that has an oval, rounded shape to provide a streamlined body over which the plastic resin powder can easily flow. Further, the insert includes outboard wings of a much different shape and which lie closer to the main body but extend vertically above and below a line extending parallel with the top and bottom of that main body. By forming the insert with this modified structure, dislogement during the molding cycle as well as rotation within the molded plastic are both substantially reduced and flow of the resin powder is not inhibited. Thus, the insert can be uniformly embedded so that it will resist substantial rotational loads and remain in place during molding. Since the wings are positioned much closer to the main body portion the insert can be moved closer to corners and due to the size of the opening defined within the wings, resin powder flows there through to and around the front areas of the insert to assure proper embedding.

Other objects, features, and characteristics of the present invention, as well as the methods and operation and functions of the related elements of the structure, and to the combination of parts and economies of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENT INVENTION

With reference to the known insert set forth in FIGS. 1–4, the above background discussion describes this insert as well as the problems associated with its use.

The present invention has been developed in an effort to resolve those problems and to find an insert that would resist rotation within the molded structure, about both a horizontal and vertical axis through the device. As requirements for the insert, it was determined that the insert must have a high resistance to pull forces, whether applied by a latch, hinge or handle, such that the wall into which it is molded will not be distorted by reason of that force. In addition the insert must have high resistance to lateral sheer forces without distorting either the insert or the wall in which it is molded. Molding must occur so that the insert will be fully encased and will not result in an air leak either through the creation of voids or because of its twisting within the molding material or and the shape of the insert must be stream-lined and sufficiently open so that the powdery plastic material within the rotating mold can flow around it freely and will form a complete and secure molded plastic layer about the desired portions of the insert, without the creation or development of any voids.

Further, the vertical height of the insert must not be too great or excessive as it is occasionally desirable that a hinge or latch be positioned as close as possible to the parting line of the container portions. Thus, it is not appropriate for the insert to project above the parting line of the mold. Similarly, if the insert itself extends too far below the parting line of the mold then the handle attachment point will be also positioned too far from that parting line and that is equally undesirable.

The preferred result is that the shape and design of the insert be substantially symmetrical about both the horizontal and vertical axis through the device, and relative to the points at which the items of attachment will be attached. This symmetry, will result in there only being one result as to how the shape of the insert lies within the mold regardless of how the device is placed in the mold thus eliminating the possibility that the installation of the insert could be done incorrectly. It was also desired to have the insert itself be as stable as possible when held magnetically against the mold wall to resist being tilted or otherwise moved or dislodged by the plastic powder resin that would pass over and flow around during molding. Because of the size of the insert shown in FIGS. 1-4 the wings provided a very large area and the flowing plastic resin powder frequently dislodged the insert from the desired position thereby resulting in a damaged molded product.

Figure 1:
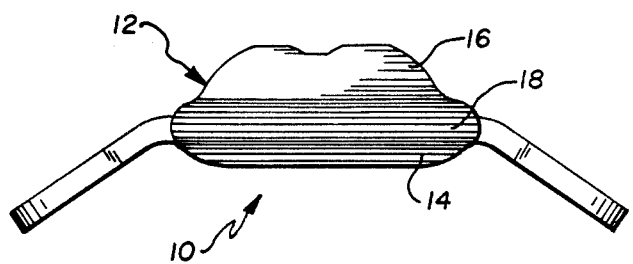
FIG. 1 is a top plan view of the prior insert.
Figure 2:
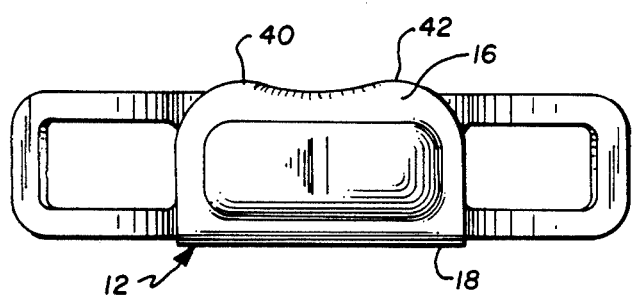
FIG. 2 is a rear elevational view of the insert shown in FIG. 1.
Figure 3:
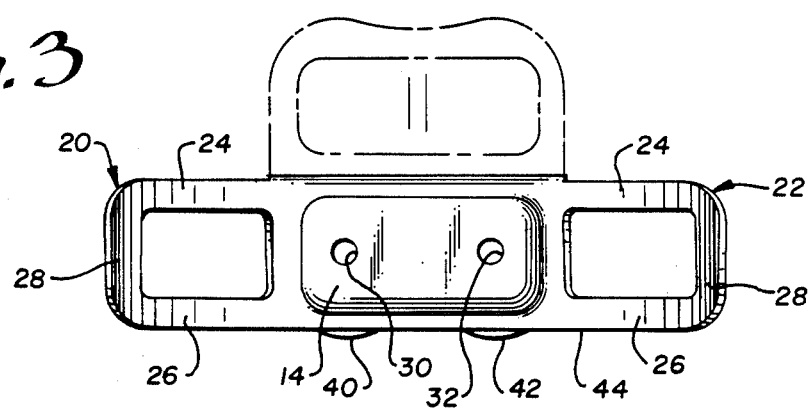
FIG. 3 is a front elevational view of the insert shown in FIG. 1.
Figure 4:
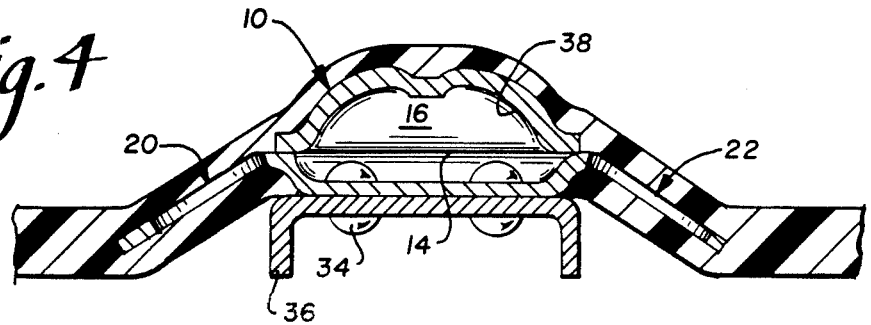
FIG. 4 is a cross-sectional view of the insert imbedded within a plastic container and with a device attached thereto by rivets.
Figure 5:
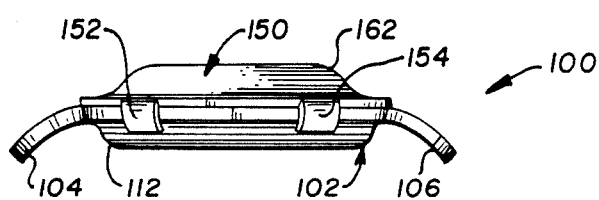
FIG. 5 is a top plan view of the improved insert member according to the present invention.
Figure 6:
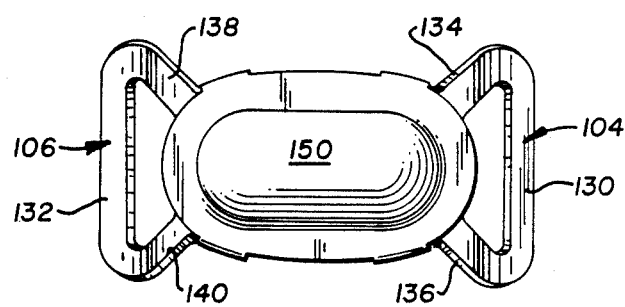
FIG. 6 is a rear plan view of the modified insert shown in FIG. 5.

Turning now to FIG. 5, the modified insert generally indicated at 100 is comprised of a main body section 102 which is integrally formed together with horizontally extending modified wings 104 and 106. The central portion of the structure includes an outer peripheral section indicated at 108 and a relatively large, substantially planar front face 110 on an expanded or outwardly extending generally indicated at 112. The expanded portion 112 has a depth such that front face 110 is spaced about 0.110 inches from the outer periphery 108 with this dimension being greater than the dimension for the similar portion in the insert shown in FIGS. 1-4 which was 0.090 inches.

Figure 9:
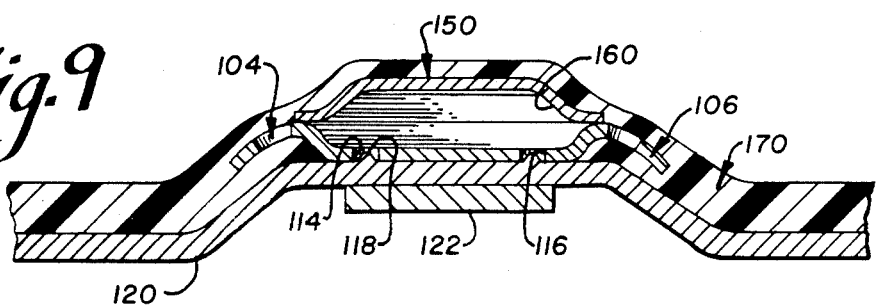
FIG. 9 is a cross-sectional view of the device imbedded within the plastic material and showing a portion of the mold prior to the molded product being removed therefrom.

Front face 110 is also provided with two apertures 114 and 116, as shown in FIG. 9, which cooperate with two projections or nibs 118 for purposes of better aligning in insert 100 within the mold and provide the openings to use when riveting fixtures to the container. In order to temporarily restrain the insert 100 within a roto-mold, a magnet 122 is employed to provide the necessary holding force. The combined effect of magnet 122 and nibs 118 together with the insert streamlines and rounded shape of the insert causes the insert to be retained in a much more stable condition and be kept in the correct place within the mold so that it will not be tilted or otherwise dislodged by the plastic resin powder as the roto-mold is rotated.

Each of the wings 104 and 106 are shaped substantially the same and each includes a vertically extending outer piece 130 and 132, respectively, which are connected at each end by connecting arms which extend at an acute angle back to the main body portion 102, with these connecting arms being indicated at 134-140. Arms 134-140 are positioned at approximately a 45° angle with respect to the axis of the outer vertical members 130 and 132, respectively. The vertical members 130 and 132 are spaced from the peripheral area 108 by a distance of about 0.15 inches with the overall outer length of the insert 100 being about 1.65 inches and the central body having a length of about 1.15 inches. The vertical height of the wings at their widest point is about 0.9 inches with the vertical height of the body portion being about 0.65 inches so that the wings extend vertically through and beyond a horizontal plane defined by the top and bottom edges of the central portion of the insert. The distance between apertures 114 and 116, from center line to center line, is about 0.55 inches and the thickness of the material forming members 130-140 is about 0.050 inches.

Figure 7:
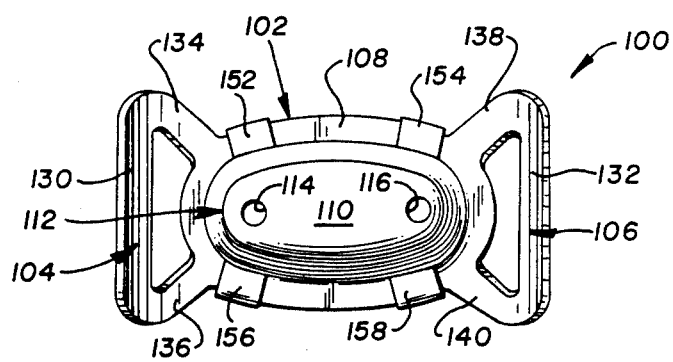
FIG. 7 is a front elevational view of the insert shown in FIGS. 5 and 6.
Figure 8:
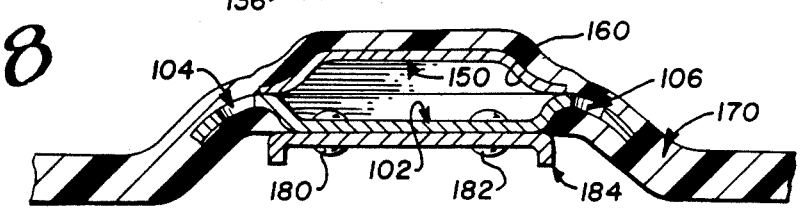
FIG. 8 is a cross-sectional view showing the modified insert of FIGS. 5–7 imbedded within a plastic container with a device attached thereto.

The modified insert shown in FIGS. 5-9 also includes a rear member 150 which includes four tabs 152, 154, 156 and 158 which when folded around the peripheral section 108 securely hold the rear member 150 in place. The front and rear members define a hollow space 160 therebetween as shown in FIGS. 8 and 9. Rear member 150 includes a pressed out area 162 that is characterized by rounded surfaces to enhance flow of resin powder about the insert.

The rear member is made from material, preferably metal, having a thickness of about 0.015 inches whereas the front section 102 is made from material having a thickness of about 0.048 to 0.050 inches.

As shown in FIG. 8, once the device is molded in plastic, with the plastic being generally indicated at 170. Arms 104 and 106 as well as the rear member 150 and a major portion of the front section including the beveled area 108 and excluding preferably only the front face 110 of the insert is fully imbedded within the plastic. In addition, rivets as indicated at 180 and 182 can be used to hold a device which is indicated at 184 in place on the front of the device. As is noted from FIGS. 5 and 6, the rear surface of the insert has a very rounded rear face including the extended portion 162 and its sides which curve gracefully down toward the marginal edges of the rear face that merge with the front section. In addition, arms 104 and 106 can either be curved or can be bent at an angle and be otherwise straight with the intent being to generally follow the curve or direction of the wall of the mold to be used. Because they extend outwardly from the main body section a relatively short distance, in comparison with the embodiment shown in FIGS. 1-4, the exact shape is not as critical. Further, because the openings which extend therethrough are relatively large, resin powder can flow in a smooth stream line manner not only over the entire device but through such openings and about the in peripheral portions of front face 110.

The design of the wings so as to extend above the top and bottom edges of the central portion of the insert, provides much better resistance to rotation and increases the pull out resistance even in relatively thin wall designs. Because of the reduced size and the increased pull out resistance which characterizes the present mold insert design, the indented areas within the containers can, when desired, be positioned closer to the corners thereby allowing a latch to be moved closer to the corner providing a greater amount of holding power closer to that corner. However, should the indent be too close to the corner or too thin, a drop of the container on a corner might cause the force applied to create a compression indent area which could spread or cause the container to break.

In comparison pull tests between the original and new embodiments attention is directed to the following tables which sets forth the results of pull-testing inserts of both the old design and the new design. The wall thickness for the standard mold charge was about 0.20 inches; the wall thickness at an 80% mold charge was about 0.16 inches.

| INSERT PULL TEST | | |
|---|---|---|
| Old Insert Std. Charge | New Insert Std. Charge | New insert 80% Charge |
| 1 750 lbs. | 875 lbs. | 750 lbs. |
| 2 725 | 800 | 750 |
| 3 750 | 800 | 700 |
| 4 800 | 825 | 750 |
| 5 725 | 800 | 725 |
| 6 750 | 800 | 750 |
| 7 750 | 825 | 700 |
| 8 800 | 825 | 800 |
| 9 750 | 800 | 700 |
| 10 725 | 800 | 750 |
| 11 750 | 875 | 750 |
| Average = 752 lbs. | 820 lbs. | 738 lbs. |

The oval shape of the present insert also provides a stream line body over which the plastic resin material can flow for that stream line flow causes less distortion or likelihood that the insert will move or be dislodged during holding procedures.

Further, it should be noted that the plane established by the front face 110 is spaced a farther distance from the peripheral rim 108 than is the distance between the front face of the insert shown in FIGS. 1-4 and the peripheral area thereabout. This serves to provide additional spacing between the wings 104 and 106 in the interior surface of the mold and helps assure the formation of solid plastic material between the wings and the inner portions of the insert in the inner surface of the mold thereby preventing the formation of voids in the plastic material.

It should also be noted, that the outer periphery of the rear section 150 does not extend above the marginal edges of the main center section of the front portion is clearly shown in FIG. 7 so that no portions extend outwardly beyond the periphery thereof. The flaps 152-158 serve only to hold the rear section onto the front section and are non-functional following molding.

The loops must still be bent to conform to the indented container walls. But since the loops are much shorter than those of the original insert, the match between the bent loops and the mold is not critical to achieve coverage of the loops by the container material. Using the new insert, wall thickness reductions of about 40% have been made while retaining void-free air-tight moldings. The loops of the improved insert are considerably higher than the body of the insert. The loops terminate against the body of the insert at an angle of about 40 to 45 degrees from the horizontal. Pull tests of this insert with the force being applied parallel to the container wall as it would be the case for forces created by a latch in tension, show this insert to be more resistant to pullout. The original insert tended to fail by rotating about a horizontal axis at about 750 lbs. at room temperature with a polyethylene container wall thickness of approximately 0.20 in. The loops of the new insert are more effective in resisting rotation about both horizontal and vertical axes. Even with the wall thickness reduced to 0.16 in., and using the same polyethylene material, the new insert supported up to about 738 lbs.

The sidewise strengths of both the old and new designs are equivalent.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An insert for use in molded articles, said insert having a front portion defined by a central section and a pair of outboard wing members, each of said wing members having an outer vertical member having a length greater than a height of the central section and being spaced from said central section and a pair of connecting arm elements, each said connecting arm element extending from an opposing end of the vertical member to said central section.

2. An insert as in claim 1 wherein the central section has an oval shape.

3. An insert as in claim 1 wherein the insert is substantially symmetrical about horizontal and vertical axes extending there through.

4. An inert as in claim 1 wherein the arm elements extend from the vertical member to the central section at an angle of about 45 degrees.

5. An insert as in claim 1 wherein the central section includes a front flat face with the insert being positioned within the molded article so that at least a portion of the front face is exposed on the exterior of the molded article.

6. An insert as in claim 5 wherein the front face includes means defining at least one aperture.

7. An insert as in claim 1 further including a rear portion secured to said front portion so as to define a hollow chamber there between.

8. An insert as in claim 7 wherein the rear portion has a rounded, stream lined shape that blends into the front portion.

9. A device for being embedded within integrally molded containers for providing an attachment point on the molded container, said device comprising a hollow main body portion having a predetermined vertical height and a pair of outwardly extending wing members, each of said wing members having a maximum vertical height which is greater than said predetermined vertical height of said hollow main body portion.

10. A device as in claim 9 wherein each of said wing members includes upper and lower arm elements each connected to and extending at an angle away from said main body portion and an outer arm element spaced from said main body portion and extending between said upper and lower arm elements.

11. A device as in claim 10 wherein the device is substantially symmetrical about horizontal and vertical axes extending therethrough.

* * * * *

UNITED STATES PATENT AND TRADEMARK OFFICE
CERTIFICATE OF CORRECTION

PATENT NO. : 4,741,972
DATED : May 3, 1988
INVENTOR(S) : James S. Hardigg

It is certified that error appears in the above-identified patent and that said Letters Patent is hereby corrected as shown below:

Column 3, line 41, change "rea" to --rear--.

Column 4, line 34, change "devicc" to --device--.

Column 8, line 31, change "inert" to --insert--.

Signed and Sealed this

Thirty-first Day of January, 1989

Attest:

DONALD J. QUIGG

*Attesting Officer*     *Commissioner of Patents and Trademarks*